US008395087B2

(12) United States Patent
Bohlender et al.

(10) Patent No.: US 8,395,087 B2
(45) Date of Patent: Mar. 12, 2013

(54) HEAT-GENERATING ELEMENT AND HEATING DEVICE COMPRISING THE SAME

(75) Inventors: Franz Bohlender, Kandel (DE); Kurt Walz, Hagenbach (DE); Michael Niederer, Kapellen-Drusweller (DE)

(73) Assignee: Eberspacher catem GmbH & Co. KG, Herxheim (DE)

( * ) Notice: Subject to any disclaimer, the term of this patent is extended or adjusted under 35 U.S.C. 154(b) by 665 days.

(21) Appl. No.: 12/409,637

(22) Filed: Mar. 24, 2009

(65) Prior Publication Data

US 2009/0255914 A1 Oct. 15, 2009

(30) Foreign Application Priority Data

Apr. 11, 2008 (DE) ........................ 10 2008 018 617
Jun. 4, 2008 (EP) .................................... 08010213

(51) Int. Cl.
*B60L 1/02* (2006.01)

(52) U.S. Cl. ....................................... 219/202; 219/201

(58) Field of Classification Search .................. 219/202, 219/544, 548–549, 550, 553, 538, 520, 532, 219/505, 530, 504, 540, 481, 205, 200, 485, 219/483; 392/485, 483, 488, 347, 397, 441, 392/480, 502, 375, 436, 435, 495; 361/93.7, 361/104, 103, 634, 679, 106, 111, 58, 119, 361/118, 124, 126, 127, 18, 56; 29/592.1, 29/611, 846, 857, 612, 610.1, 621, 874, 413
See application file for complete search history.

(56) References Cited

U.S. PATENT DOCUMENTS 4,327,282 A 4/1982 Nauerth
4,481,057 A * 11/1984 Beard ........................... 156/216
6,602,810 B1 * 8/2003 Christensen et al. ......... 442/232
7,777,161 B2 8/2010 Zeyen et al.
2003/0132222 A1 7/2003 Bohlender
2004/0214519 A1 * 10/2004 Nogueira et al. ............. 454/270
2007/0068914 A1 * 3/2007 Zeyen et al. .................. 219/201
2007/0145035 A1 6/2007 Zeyen et al.

FOREIGN PATENT DOCUMENTS

DE 102007032896 A1 3/2008
EP 1916873 A1 4/2008
JP 63259929 A 10/1988
JP 7142151 A 6/1995
JP 2004146093 A 5/2004

OTHER PUBLICATIONS

European Search Report for European Patent Application No. EP 08 01 0213 Dated Jul. 22, 2009.

* cited by examiner

*Primary Examiner* — Henry Yuen
*Assistant Examiner* — Phuong Nguyen
(74) *Attorney, Agent, or Firm* — Boyle Frederickson, S.C.

(57) ABSTRACT

A heat-generating element includes at least one PTC heating element and an insulating housing enclosing the PTC heating element, as well as electric conductors whose inner surfaces are in contact with opposed sides of the PTC heating element. The respective outer surfaces of the electric conductors are covered by an insulating layer comprising at least two interconnected plastic sheets and fixedly connected to the housing. In another aspect, a heating device includes a plurality of heat-generating elements can comprise at least one PTC element and electric conductors that contact opposed lateral surfaces of the PTC element, and heat-emitting elements arranged in parallel layers in contact with opposed sides of the heat-generating element. The heating device has heat-emitting elements which are in contact with opposed sides of the heat-generating element via an interposed insulating layer comprising at least two interconnected plastic sheets.

21 Claims, 4 Drawing Sheets

HEAT-GENERATING ELEMENT AND HEATING DEVICE COMPRISING THE SAME

BACKGROUND OF THE INVENTION

1. Field of the Invention

The present invention relates to a heat-generating element and a heating device for heating air, comprising at least one PTC element and electric conductors which are in contact with opposed lateral surfaces of the PTC element. Such a heat-generating element is known e.g. from EP 1 061 776 which is owned by the present applicant.

2. Description of the Related Art

The heat-generating element is used in particular in an auxiliary heating for a motor vehicle and comprises a plurality of PTC elements arranged successively in a row and supplied with current through electric conductors which extend parallel to one another and which are in areal contact with opposed sides of the PTC elements. The conductors are normally formed by parallel sheet metal strips. The thus formed heat-generating elements are used e.g. in a heating device used for heating air in a motor vehicle and comprising several layers of heat-generating elements whose opposed sides are in contact with heat-emitting elements. Making use of a fixture device, these heat-emitting elements are applied to the heat-generating elements in a comparatively good heat-transmitting contact therewith.

In the above-mentioned prior art, the fixture device of the heating device is defined by a frame in which a plurality of parallel layers of heat-generating and heat-emitting elements are held under spring pretension. According to an alternative embodiment, which also discloses a heating device of the type in question and which is described e.g. in EP 1 467 599, the heat-generating element is defined by a plurality of PTC elements arranged successively in a row in one plane; these PTC elements are also referred to as ceramic elements or cold conductors and have current supplied thereto at opposed lateral surfaces through conductors which are in contact with these lateral surfaces. One of these conductors is defined by a circumferentially closed profile. The other conductor is defined by a sheet metal strip which rests on said circumferentially closed metal profile via an interposed electrically insulating layer. The heat-emitting elements are defined by lamellae, which are arranged in a plurality of parallel layers and which extend at right angles to the circumferentially closed metal profile. In the case of the heating device of the type in question known from EP 1 467 599, a plurality of circumferentially closed metal profiles having the structural design described hereinbefore is provided, said circumferentially closed metal profiles being arranged parallel to one another. The lamellae extend partly between the circumferentially closed profiles and they partly project beyond these profiles.

The above-mentioned heat-generating elements necessitate a good electric contact between the electric conductors and the PTC elements. Otherwise, there will be the problem of an increased transfer resistance which, especially when the heat-generating elements are used in auxiliary heatings for motor vehicles, may result in local overheating due to the high currents. This thermal event may cause damage to the heat-generating element. In addition, the PTC elements are self-regulating resistance heaters which emit less heat in response to an increase in temperature, so that local overheating may cause a failure of the self-regulating characteristics of the PTC elements.

Moreover, high temperatures in the area of an auxiliary heating may lead to a development of fumes or gases that may be directly hazardous to the health of persons in the passenger compartment.

Just as problematic is the use of the heat-generating elements of the type in question at high operating voltages, e.g. at voltages up to 500 volts. One problem arising in this respect is that the air flowing onto the heat-emitting elements carries moisture and/or dirt, which may enter the heating device and cause there an electric flashover, i.e. a short circuit. Another fundamental problem is that persons who work in the area of the heating device have to be protected against the current-carrying parts of the heating device and of the heat-generating element, respectively.

WO 99/18756 discloses an immersion heater with PTC heating elements which are arranged between electric conductors and covered with insulating layers so as to insulate said electric conductors with respect to the metal housing of the immersion heater. In the case of this prior art, the housing sealingly encloses the PTC heating elements. For the purpose of insulation, a plate made of an insulating ceramic material is provided between the housing and the respective heat-generating element.

SUMMARY OF THE INVENTION

It is the object of the present invention to provide a heat-generating element of a heating device as well as a corresponding heating device, which offer more safety. The present invention especially aims at increasing the safety with respect to a possible electric flashover.

In particular, the present invention also aims at providing a heating device with a plurality of heat-generating elements, which comprises at least one PTC element and electric conductors that are in contact with opposed lateral surfaces of the PTC element, and a plurality of heat-emitting elements arranged in parallel layers and supported such that they are in contact with opposed sides of the heat-generating element, and which can be operated at high currents safely and effectively.

For solving the problem with respect to the heat-generating element, the present invention suggests that the above-mentioned heat-generating element should be further developed by implementing it such that the respective outer surfaces of the electric conductors are covered by an insulating layer comprising at least two interconnected plastic sheets, and that the insulating layers are fixedly connected to the housing.

It turned out that a very good dielectric strength of e.g. 4 kV and more can be achieved, when a multilayer sheet is provided directly on the conductor, if desired also with an intermediate ceramic layer between said multilayer sheet and the conductor. This multilayer sheet is preferably glued directly to the ceramic layer or the conductor by lamination. The use of a multilayer sheet allows, on the basis of a thickness which is fundamentally equal to that of a single-layer sheet, a better mechanical protection, since the interconnected sheets will be able to withstand mechanical stresses more effectively than a single-layer sheet, without any formation of cracks and without failure. It follows that, for improving the heat transfer, the layer thickness of the insulating layer can be reduced, the mechanical strength remaining the same or being even better than before. The insulating layer can be defined exclusively by the multilayer sheet, which is preferably provided on the outer side of the heat-generating element, so that a heat-emitting element, e.g. a layer of lamellae, will be in direct contact with the sheet. Alternatively, the sheet and the conductor may have provided between them one or a plurality of ceramic layers as part of the insulating layer.

The insulating layer should preferably be in direct contact with the electric conductors so that the heat transfer from the heat-generating elements to the heat-emitting elements will only be impaired to a minor extent. The insulating layer should have the best possible thermal conductivity. The aimed-at thermal conductivity is higher than 4 W/(m K). An insulating layer with an electric insulation of more than 6 kV/mm proved to be useful with respect to the best possible protection against short circuits. The dielectric strength of the insulating layer should, preferably in the transverse direction of the layered structure, be at least 2000 V, preferably at least 3000 V.

In the case of the heat-generating element according to the present invention, the insulating layers are fixedly connected to the housing, which is an insulating housing. The insulating layers are in contact with the outer surfaces of the electric conductors and cover said conductors. The conductors, in turn, accommodate between them the at least one PTC element which is enclosed by the insulating housing. Hence, a structural design is obtained in which the upper and the lower side of the heat-generating element is covered by the insulating layer, whereas the lateral face of the heat-generating element extending therebetween are enclosed by the insulating housing. It follows that the at least one PTC element is accommodated and encapsulated by the housing and the insulating layers which are fixedly connected to the housing, such that it is sealed from the surroundings. The housing as such can define a plurality of reception openings for accommodating individual PTC heating elements or a plurality of PTC heating elements. In addition, the wall of a reception means defined by the housing and used for accommodating a plurality of PTC heating elements can be contoured so as to space apart individual PTC heating elements and define divisions. For example, an elongate reception means of the housing can be implemented such that a plurality of PTC heating elements can be arranged successively in a row, the reception spaces for the individual PTC elements being separated by inwardly projecting webs.

If desired, the insulating layer can be glued directly to the electric conductor. For improving the thermal conductivity between the conductor and the insulating layer, the adhesive layer provided should be as thin as possible and have a thickness of less than 20 μm. For the same reasons, the plastic sheet is preferably laminated onto the ceramic plate, if such a plate is provided. The sheet has provided thereon, preferably on one side thereof, a wax layer having a thickness of 10 to 15 μm; especially under the operating conditions of the heat-generating element, i.e. at elevated temperatures of approx. 80° C., and when the insulating layer is being pressed onto the conductor, this wax layer will fuse and allow an efficient transfer of heat. In this respect, it will be of advantage when the heating device consisting of parallel layers of heat-generating and heat-emitting elements is arranged in a frame and when this layered structure is held in said frame under spring pretension, as is already fundamentally known from EP 0 350 528, which is owned by the applicant. An alternative embodiment has been described e.g. in EP 1 515 588.

The heat-generating element as such can be defined by a plurality of successively arranged PTC elements, conductors covering said PTC elements on both sides, and insulating layers covering the respective conductors on the outer side thereof. All the components of this layered structure can be interconnected, in particular joined by means of an adhesive. The electrically conductive insulating layer should preferably extend beyond the electric conductor so that the electrically conductive and current-carrying components of the heat-generating element are located behind the outer insulated edges of the heat-generating element in spaced relationship with said edges. The electric conductor can project beyond the insulating layer so as to form an electric contacting point.

For precisely positioning the PTC elements, the present invention suggests, according to another preferred embodiment, that a positioning frame, which is known per se, should be provided on the heat-generating element; said positioning frame defines a frame opening for receiving therein the at least one PTC element and it can be regarded as an insulating housing within the meaning of the present invention. This positioning frame, which is known per se, is described e.g. in the above-mentioned EP 0 350 528 and is normally produced from a non-conductive material, in particular from a plastic material. The positioning frame is normally implemented as an elongate component defining in the plane of the PTC element or elements of the heat-generating element a frame opening for one or more PTC elements. The PTC element or elements is/are positioned in this frame opening. Such a positioning frame can essentially define the insulating housing, and the upper and the lower side thereof can be fixedly connected to the insulating layers. In order to achieve this, the insulating layers can be connected to the positioning frame by means of an adhesive or by welding. It is also possible to shape the plastic material of the insulating housing so as to connect the insulating layers to the housing. Any kind of connection which is suitable for providing a fixed and preferably tight connection between the insulating layer and the housing material is suitable for realizing the present invention.

For further improving the adhesively joined plastic sheets, the present invention suggests, according to a preferred further development, that these plastic sheets should be connected to one another and enclose between them a knitted fiber fabric. The plastic sheets can, for example, be laminated onto the knitted fiber fabric on both ides thereof. The knitted fiber fabric may e.g. exclusively consist of fiber strands which extend substantially parallel to one another in a non-overlapping or hardly overlapping mode of arrangement. What is, however, preferably used is a knitted fiber fabric which is more suitable for resisting multiaxial stress states within the composite structure of the at least two plastic sheets enclosing the intermediate knitted fiber fabric. The use of fibers having a low electric conductivity is recommended. Also with respect to the thermal stress on the fibers of the knitted fabric, a preferred further development suggests that a glass fiber fabric should be used. Furthermore, the fibers of the knitted fabric are preferably soaked with silicone so that the knitted fiber fabric will be enclosed between the plastic sheets substantially free from air. In addition, a complete wetting of all the fiber strands of the knitted fabric will result in a firm and therefore good connection between the opposed layers of sheets.

In particular for externally insulating heat-generating elements, which are installed in an air heating device e.g. for heating the passenger compartment of a motor vehicle, it proved to be advantageous to join at least two multilayer plastic sheets by means of an adhesive and to provide these plastic sheets on the outer side of the heat-generating element such that they cover the conductors directly or indirectly. Each individual one of the multilayer sheets comprises at least to adhesively joined plastic sheets. An insulating layer comprising two multilayer adhesively joined sheets, each of said multilayer sheets comprising two adhesively joined plastic sheets which are joined directly or via an interposed knitted fiber fabric, proved to be a particularly effective suggestion with respect to an efficient heat transfer through the insulating layer to the outside and with respect to a reliable and sufficient insulation.

For the specially aimed-at high-voltage applications, plastic sheets having a dielectric strength of at least 1.05 kV proved to be particularly efficient in dielectric strength tests of such sheets. This dielectric strength is provided by each individual one of the sheets which are interconnected to one another. The thickness of each individual plastic sheet should be between 0.05 and 0.09 mm, preferably between 0.06 and 0.08 mm. Suitable materials for forming the plastic sheet are polyimide, polyamide, silicone or Teflon (PTFE). The adhesively joined layers can be implemented such that they consist of identical materials or they can be made of different plastic materials. With respect to a good mechanical strength of the interconnected plastic sheets, said sheets should preferably be interconnected in a bubble-free manner, e.g. by lamination. An adhesive which is particularly suitable for connecting the two plastic sheets is a silicone-containing adhesive.

For circumferentially insulating the PTC heating element and the conductors which are in contact therewith, a further preferred embodiment of the present invention suggests that the respective insulating layer should be connected to a housing by means of insert moulding. This housing can consist of two housing shells which are connected to one another. Housing shells that proved to be particularly advantageous are shells comprising two housing elements which abut on one another with an interposed compressible element whose sealing effect improves when pressure is applied to the heat-generating element from outside. This structural design has especially been created for installing the heat-generating elements in a frame of an electric heating device in which the at least one heat-generating element and heat-emitting elements that are in contact with the outer side thereof are supported and held in contact with one another under spring pretension, said spring resting on the inner side of the frame.

For improving the strength of the housing, a further preferred embodiment of the present invention suggests that the insulating layer should be connected to the housing by means of insert moulding such that at least the ends of the conductor are encompassed. It follows that the plastic material defining the housing encloses at least an end portion of the conductor, which normally consists of a sheet metal strip, so that a comparatively stiff housing having a fixedly predetermined contour is defined. The housing preferably consists of a thermoplastic elastomer or silicone.

For solving the parallel problem underlying the present invention with respect to the heating device, it is suggested that the above-mentioned heating device should be further developed insofar as the heat-emitting elements should be in contact with the opposed sides of the heat-generating element via an interposed insulating layer comprising at least two interconnected plastic sheets. Accordingly, the two plastic sheets are in contact with the outer side of the heat-generating element and define the contact surface for a heat-emitting element consisting e.g. of a meandering aluminum strip or copper strip.

The heating device of the present invention preferably contains a heat-generating element as further specified above. In particular, the one or more heat-generating element comprised in the heating device can embody any of the above-described preferred embodiments. The features contained in any of the dependent claims being directed to a heat-generating element likewise be used for deliminating the subject matter of the claim being directed to the heating device.

Further details of the present invention can be seen from the following description of embodiments of the invention in combination with the drawings, in which;

DETAILED DESCRIPTION OF THE PREFERRED EMBODIMENTS

Figure 1:
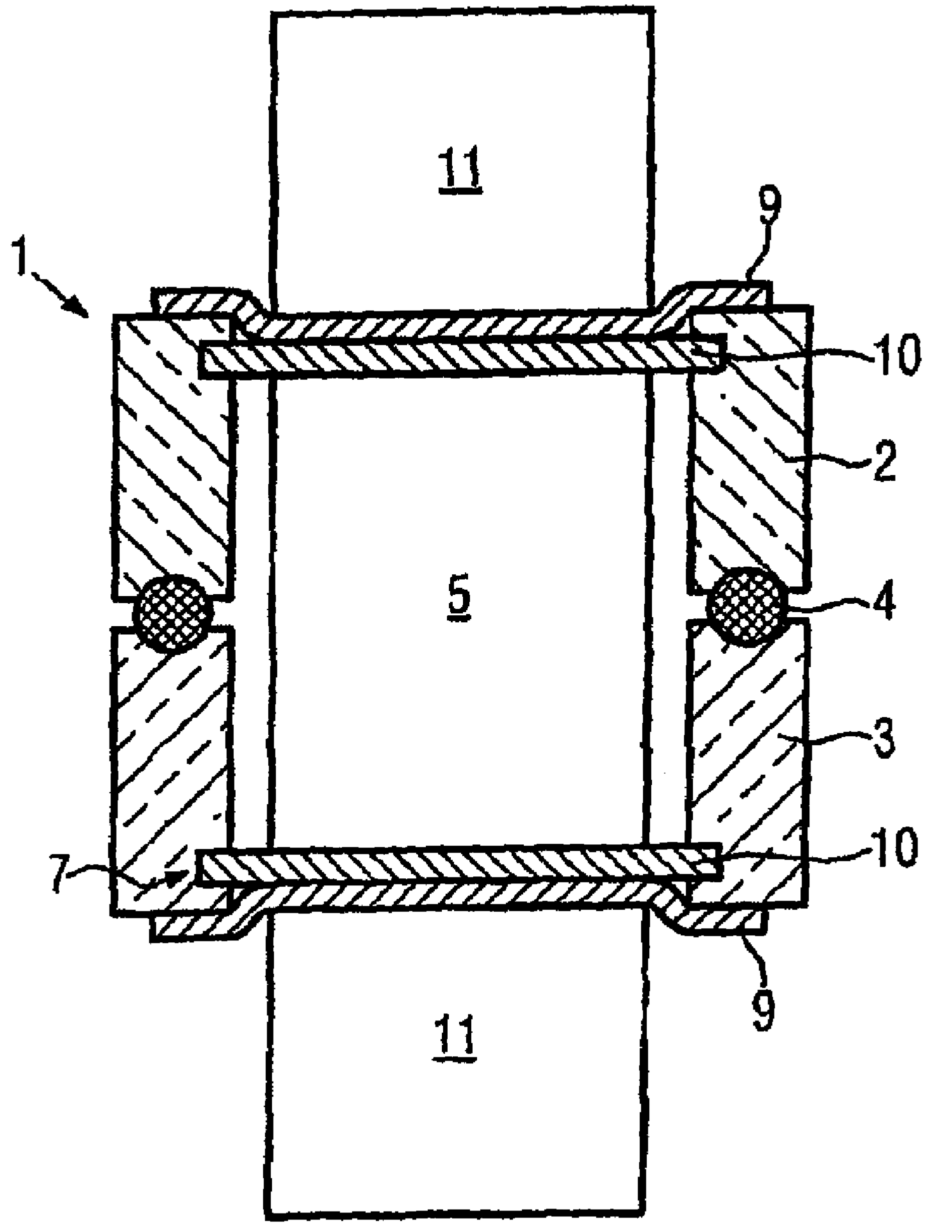
FIG. 1 shows a cross-sectional view of a first embodiment of a heat-generating element with radiator elements of an electric auxiliary heating abutting thereon.

FIG. 1 shows a cross-sectional view of a first embodiment of a heat-generating element 1 comprising two elongate U-shaped housing elements 2, 3 each of them fabricated as a plastic injection moulded part. The housing shell elements 2, 3 have on respective opposed transverse sides a sheet metal strip 10 and an insulating layer 7 abutting thereon. The ends of the respective sheet metal strips 10 are encompassed by the plastic material which essentially defines the housing elements 2, 3. The two sheet metal strips 10 are connected to the respective plastic material of the housing elements 2, 3 by insert moulding. The outer side of the respective housing elements 2, 3 has applied thereto an insulating sheet 9 such that the sheet metal strips 10 are covered at the longitudinal edges thereof; the insulating layer 7 provided on the outer side of the heat-generating element 1 is here fully defined by said insulating sheet 9 which will be described in detail in the following.

The opposed end faces of the bars of the U-shaped housing elements 2, 3, which extend in parallel, enclose between them a sealing strip 4 which circumferentially seals towards the outside the interior space defined by the two housing elements 2, 3 and accommodating a PTC heating element 5. The sealing effect produced by the sealing strip increases as the pressure acting on the housing 2, 3 from outside increases.

The thickness of the sealing strip 4 is chosen such that imaginable manufacturing tolerances of the thickness of at least one PTC element 5 can be compensated by a compression of the sealing strip 4 without the two housing elements coming into contact with one another. In this context, reference should be made to the fact that PTC heating elements are subject to certain dimensional variations caused by the manufacturing process. Provided that the resilient properties and the dimension of the sealing strip 4 are adequately chosen, such thickness tolerances can be compensated by a compression of the sealing strip, so that, in the case of the imaginable thickness variations, the interior space accommodating the PTC heating element will always be circumferentially sealed.

The compression of the sealing strip, which consists of a compressible plastic material and which rests on opposed end faces of the two housing elements 2, 3, leads to a certain degree of movability of the two housing elements 2, 3 in a direction transversely to a plane extending parallel to the lower and upper sheet metal strips 10. The sealing effect produced by the compressible plastic material increases as the pressure applied to the heat-generating element 1 from outside increases.

As is normally the case, the conductors can extend beyond the housing elements 2, 3 at the front end thereof so as to project there, if necessary, beyond the outer surface of a frame which encloses the heat-generating elements and holds them under pretension in a layered structure, the conductors defining the electric connections of the frame at this location.

Figure 2:
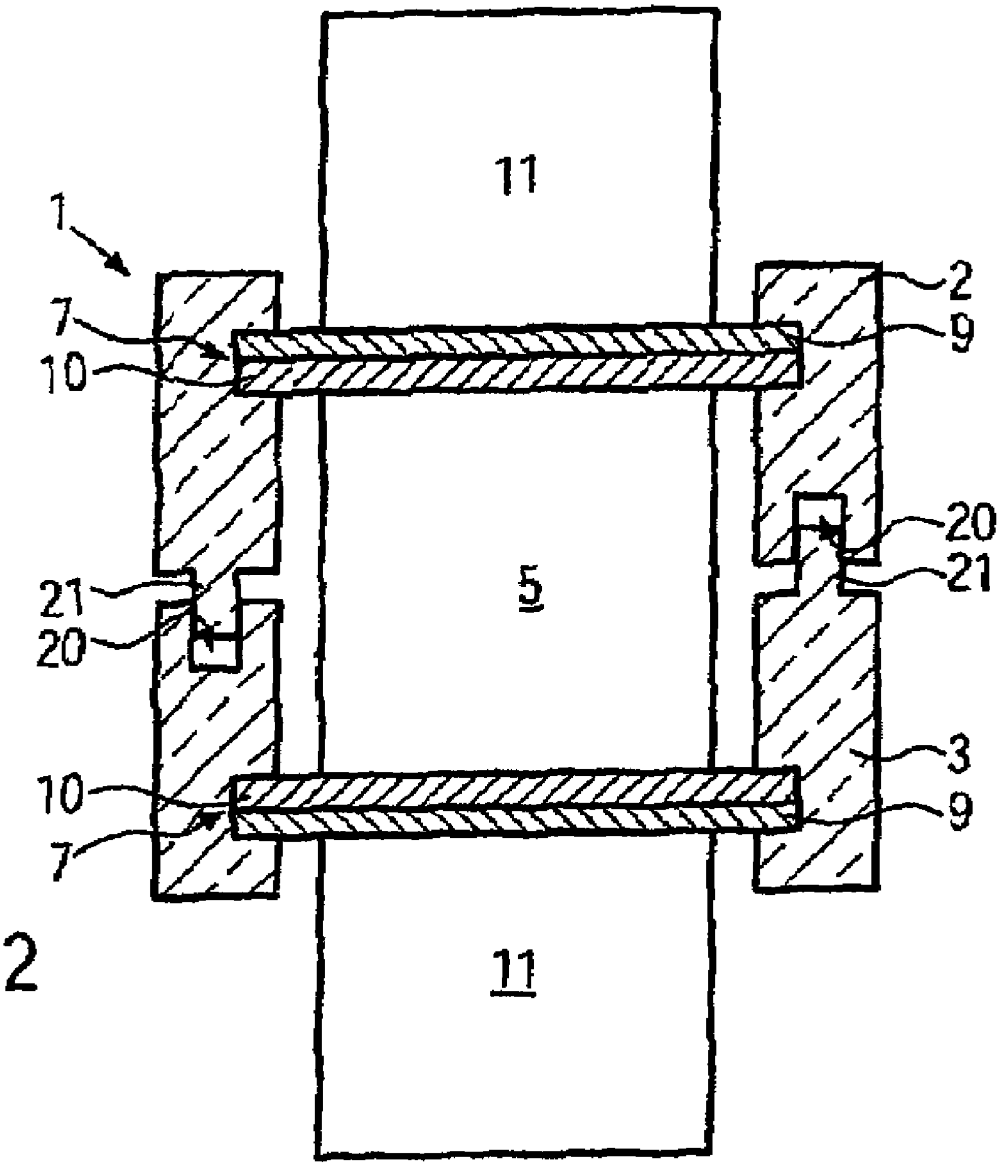
FIG. 2 shows a second embodiment of the heat-generating element.

FIG. 2 shows a cross-sectional view of a second embodiment. Components corresponding to those of the embodiment shown in FIG. 1 are designated by the same reference numerals as in FIG. 1.

FIG. 2 shows a cross-sectional view of an alternative embodiment of a heat-generating element 1 comprising a housing which consists of a housing shell element 2 and of a shell counterelement 3, said elements having a shell-like structural design. Both housing elements 2, 3 are fabricated as plastic injection moulded parts having secured thereto, by means of insert moulding, an insulating sheet 9 as well as a sheet metal strip 10 which is provided on the inner side of said insulating sheet 9 in direct contact therewith and which contacts the PTC heating element 5. The outer sides of the sheet metal strip 10 have applied thereto the multilayer sheet 9 as part of the insulating layer. This insulating sheet 9 is applied directly to the sheet metal strip 10 by lamination. The resultant plate-shaped element is connected, by means of insert moulding, to the plastic material defining the housing elements, said plastic material being preferably silicone. The heat-generating element 1 is comparatively thin in this direction so that the heat generated by the PTC heating element can reach a radiator element 11 almost unhindered by conduction. In the embodiment shown, the radiator elements 11 are, in addition, laterally held by the plastic material of the two housing elements 2, 3 and secured in position in this way. The housing element end portions produced by insert moulding specially project beyond the insulating sheet 9 on the outer side thereof, whereby the radiator elements 11, which are in direct contact with said insulating sheet 9, are prevented from being displaced transversely to the layered structure shown in FIG. 2.

Like the embodiment shown in FIG. 1, also the embodiment shown in FIG. 2 has two identically shaped housing elements 2, 3 so as to simplify the production process. One of the end faces of the respective housing elements 2 and 3 is provided with a groove 20, whereas a spring 21 projects beyond the other end face. The spring 21 of one of the housing elements 2, 3 is in engagement with the complementary groove 20 of the other housing element 3, 2 so that the interior of the housing 2, 3 is sealed. Attention should here be paid to the fact that the width of the groove 20 should exceed the thickness of the spring 21 only to an insignificant extent. The depth of the groove 20 and the length of the spring 21 are chosen such that, when PTC heating elements 5 are accommodated in the housing, these elements 5 will be in areal contact with the sheet metal strips 10 and that, in the case of shrinking and/or compression set or when manufacturing tolerances occur especially on the part of the PTC elements 5, the housing elements 2, 3 can be moved towards one another at least to a minor extent, as well as that the presumably occurring manufacturing tolerances and thermal expansion will not prevent the groove 20 and the spring 21 from being in engagement with one another in a sufficiently overlapping mode for sealing the housing.

Figure 3:
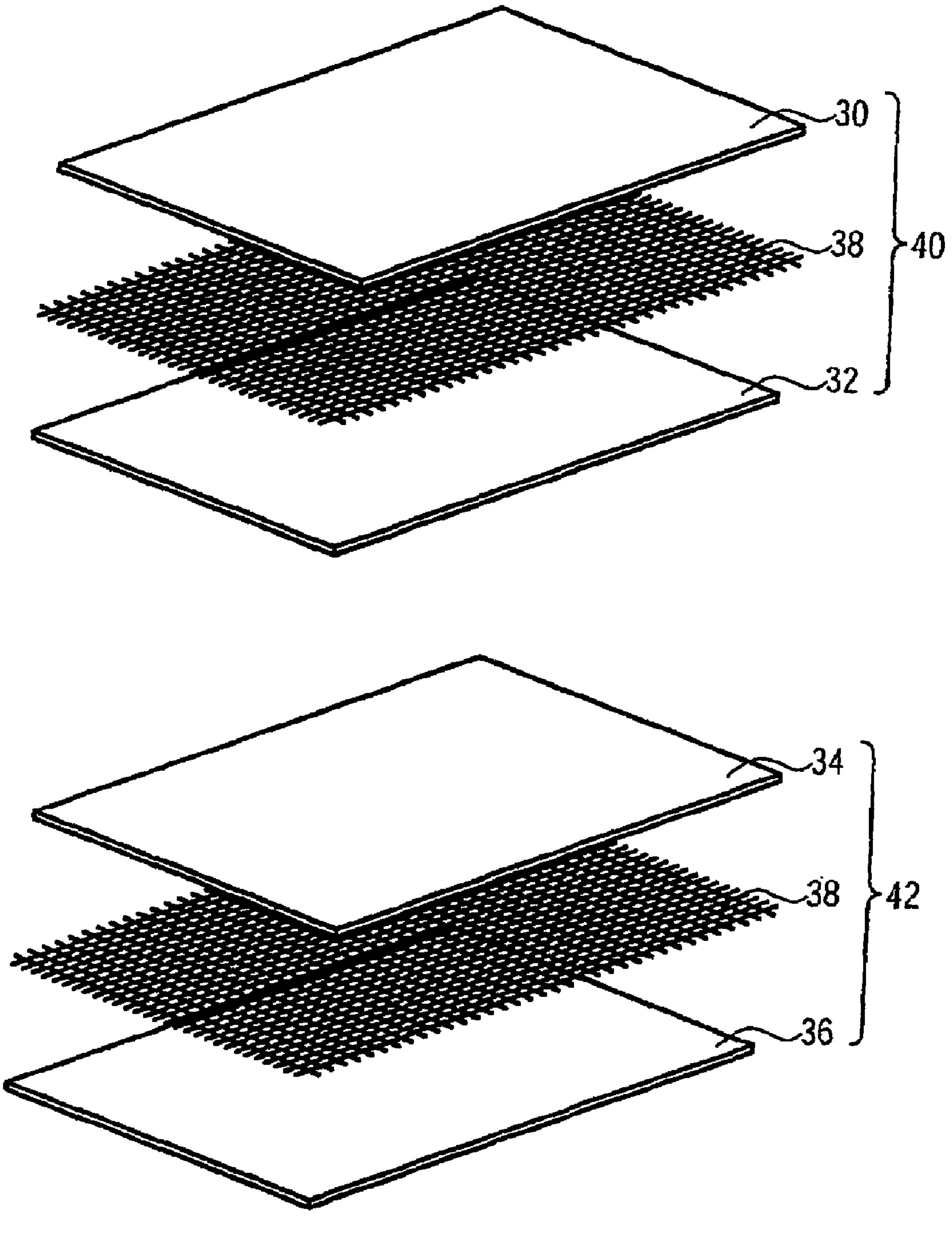
FIG. 3 shows the insulating sheet used in the embodiments according to FIGS. 1 and 2 in a perspective side view of the individual layers of the insulating sheet.

FIG. 3 shows a perspective side view of layers of the insulating sheet 9 provided on the outer surface of the above-discussed heat-generating element, said layer being shown in an exploded view. The insulating sheet 9 comprises six layers and consists of two respective two-layered plastic sheets 30, 32, 34, 36 of identical structural design, which have a thickness of 0.07 mm and which consist of silicone. Each of the plastic sheets 30 to 36 has a dielectric strength of more than 1.05 kV. The outer plastic sheet 30 is glued to the neighbouring plastic sheet 32 with a glass fribre fabric 38 interposed between the two plastic sheets. The glass fribre fabric 38 consists of interwoven glass fiber strands which extend substantially at right angles to one another. The glass fiber strands are soaked with silicone. The whole space between the plastic sheets 30 and 32 is filled with silicone. The two sheets 30, 32 and the glass fribre fabric 38 enclosed therebetween define a two-layered fiber-glass reinforced sheet 40. A two-layered fiber-glass reinforced sheet 42 located below said sheet 40 has a corresponding structural design. Each individual one of the two-layered fiber-glass reinforced sheets 40, 42 is connected to an adhesive layer, whereby a six-layered insulating sheet 9 comprising two glass fribre fabrics 38 and four plastic sheets 30, 32, 34 and 36 is obtained. The adhesive layer provided between the multilayer sheets 40, 42 consists of a silicone adhesive.

The insulating layer is not limited to the embodiment shown in FIG. 3. For example, further plastic sheets may be provided in addition to the glass fribre fabric 38. At least two sheets should be interconnected, said sheets defining a composite sheet having a dielectric strength of 2.0 kV and more. Preferably, three of these composite sheets are used as an insulating layer. A six-layered insulating layer is thus obtained in the case of which each individual insulating plastic sheet has a dielectric strength of at least 1.0 kV. The aim to be achieved is a heat-generating element for use in an auxiliary heating for the automotive industry, the heat-generating element of said auxiliary heating being protected by a dielectric strength of 300 volts. On the upper and lower surfaces of the heat-generating element, which are normally in contact with radiator elements, this protection is provided exclusively by the insulating layer 9. On the end faces, i.e. on the sides of the heat-generating element 1 which normally extend at right angles to these upper and lower surfaces, a corresponding protection is provided by the plastic material of the housing 2, 3. In order to achieve the best possible dielectric strength when the heat-generating element is used with operating voltages of up to 500 volts, the respective insulating layers should be incorporated in the housing elements 2, 3 by insert moulding, i.e. they should sealingly be incorporated therein.

Figure 4:
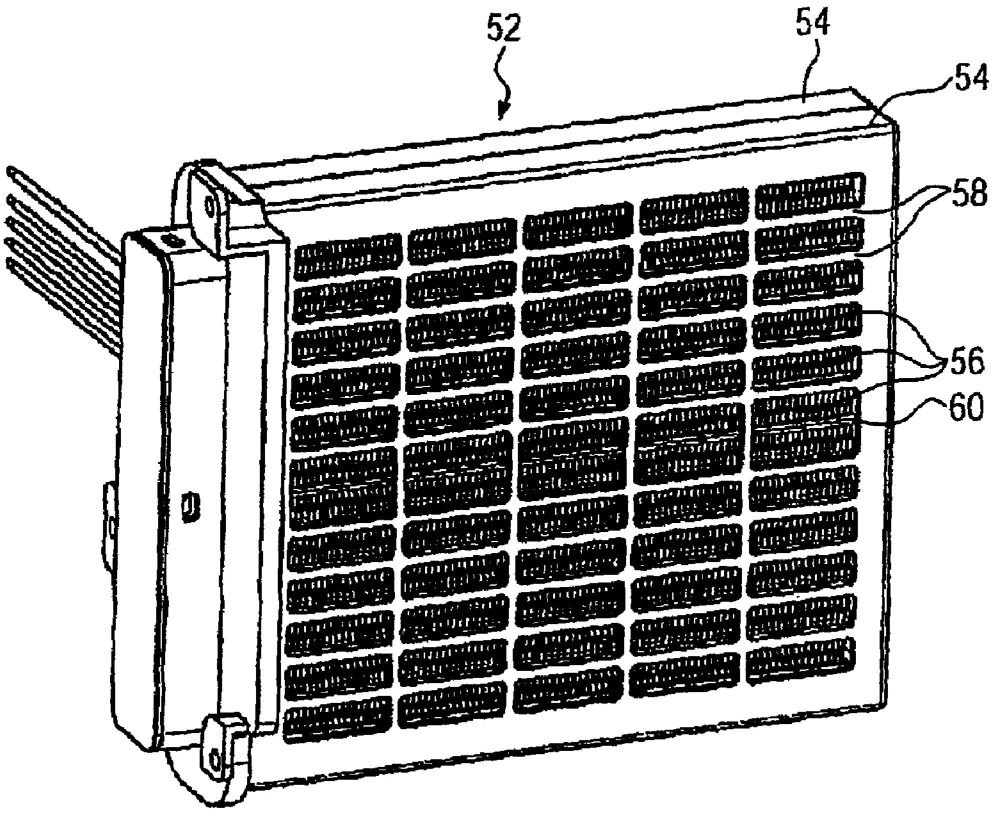
FIG. 4 shows a perspective side view of an embodiment of a heating device.

FIG. 4 shows an embodiment of a heating device according to the present invention. This heating device comprises a fixture device in the form of a circumferentially closed frame 52 defined by two frame shells 54. Within the frame 52 a plurality of layers of identically designed heat-generating elements (e.g. according to FIG. 1 or 2) is accommodated, said layers extending in parallel. The frame 52 additionally includes a spring, which is not shown and which holds the layered structure under pretension in said frame 52. Preferably, all the heat-emitting elements 56 are arranged directly adjacent to a respective heat-generating element 60. The heat-emitting elements 56 shown in FIG. 4 are defined by meandering aluminum sheet metal strips—i.e. their structural design corresponds to that of the radiator elements 11 according to FIGS. 1 and 2. The heat-generating elements are located between these individual heat-emitting elements 56 and behind the longitudinal bars 58 of a grille extending across the air inlet and outlet opening of the frame 52. In the middle of the frame 52 one of these longitudinal rods 58 has been removed for the purpose of illustration so that a heat-generating element 60 can there be seen.

In view of the fact that the heat-emitting elements 56 abut on the current-carrying components via an intermediate insulating layer 7, the heat-emitting elements 56, i.e. the radiator elements, are potential-free. The frame 52 is preferably made of plastic material, whereby the electric insulation can be improved still further. An additional protection against tampering with the current-carrying components of the heating device is provided by the grille which is also made of plastic material and formed integrally with the frame shells 54.

One end face of the frame 52 is provided, in a manner known per se, with a plug connection from which power-supply and/or control lines extend; these lines can be used for establishing control connections and power-supply connections between the heating device provided in a vehicle and said vehicle. On the end face of the frame 52, a housing is indicated which may also comprise control elements in addition to the plug connection.

The invention claimed is:

1. A heat-generating element for heating the air in an electric auxiliary heating of a motor vehicle, comprising:
- at least one positive temperature coefficient heating element;
- an insulating housing enclosing said positive temperature coefficient heating element as well as electric conductors having inner surfaces that are in contact with opposed sides of the positive temperature coefficient heating element, wherein respective outer surfaces of each of the electric conductors are covered by a respective insulating layer comprising at least two interconnected plastic sheets, and wherein
- the insulating layers are fixedly connected to the housing.

2. The heat-generating element according to claim 1, wherein the plastic sheets are connected to one another and enclose between them a knitted fiber fabric.

3. The heat-generating element according to claim 2, wherein the plastic sheets are connected to one another and include between them a glass fiber fabric.

4. The heat-generating element according to claim 3, wherein the plastic sheets are connected to one another and include between them a silicone-soaked knitted fiber fabric.

5. The heat-generating element according to claim 1, wherein each insulating layer comprises at least two sheets which comprise interconnected plastic sheets and which are adhesively joined to one another.

6. The heat-generating element according to claim 5, wherein the interconnected plastic sheets provide a dielectric strength of at least 2.00 kV.

7. The heat-generating element according to claim 5, wherein the at least two interconnected plastic sheets are in indirect contact with the electric conductors, and wherein the at least two interconnected plastic sheets are provided on the outer side of the heat-generating element.

8. The heat-generating element according to claim 5, wherein the material forming the plastic sheets is selected from the group consisting of: polyimide, polyamide, silicone.

9. The heat-generating element according to claim 5, wherein each of the plastic sheets has a thickness of from 0.05 mm to 0.09 mm, preferably of from 0.06 mm to 0.08 mm.

10. The heat-generating element according to claim 5, wherein the interconnected plastic sheets are interconnected by a silicone-containing adhesive.

11. The heat-generating element according to claim 1, wherein each insulating layer is connected to the insulating housing via insert moulding.

12. The heat-generating element according to claim 11, wherein each insulating layer is connected to the housing such that the end faces of the electric conductor are encompassed by the insulating layer.

13. The heat-generating element according to claim 12, wherein the housing is made of silicone.

14. A heating device comprising:
- a plurality of heat-generating elements, each heat generating element including at least one positive temperature coefficient element and electric conductors which are in contact with opposed lateral surfaces of the positive temperature coefficient element;
- heat-emitting elements arranged in parallel layers and supported such that they are in contact with opposed sides of the heat-generating element,
- wherein respective outer surfaces of each of the electric conductors of the heat-emitting elements are in contact with the opposed sides of the heat-generating element via an interposed insulating layer comprising at least two interconnected plastic sheets.

15. The heating device according to claim 14, wherein the plastic sheets are connected to one another and enclose between them a knitted fiber fabric.

16. The heating device according to claim 14, wherein the insulating layer comprises at least two sheets which comprise interconnected plastic sheets and which are adhesively joined to one another, wherein the interconnected plastic sheets provide a dielectric strength of at least 2.00 kV.

17. A heat-generating element for heating the air in an electric auxiliary heating of a motor vehicle, comprising:
- at least one positive temperature coefficient heating element;
- electric conductors having inner surfaces that are in contact with opposed sides of the positive temperature coefficient heating element;
- an insulating housing enclosing said positive temperature coefficient heating element and the electric conductors,
- wherein respective outer surfaces of each of the electric conductors are covered by a respective insulating layer, each insulating layer comprising at least two interconnected plastic sheets, and wherein each insulating layer is connected to the insulating housing via insert moulding.

18. The heat-generating element of claim 17, wherein each insulating layer is connected to the housing such that the end faces of the electric conductor are encompassed by the insulating layer.

19. A heating device comprising:
- a plurality of heat-generating elements, each heat generating element including at least one positive temperature coefficient heating element and electric conductors which are in contact with opposed lateral surfaces of the positive temperature coefficient heating element;
- heat-emitting elements arranged in parallel layers and supported such that they are in contact with opposed lateral surfaces of the heat generating element, wherein
  - respective outer surfaces of each of the electric conductors of the heat-emitting elements are in contact with the opposed sides of the heat-generating element via an interposed insulating layer comprising at least two interconnected plastic sheets, and wherein
  - each insulating layer is connected to the housing such that the end faces of the electric conductor are encompassed by the insulating layer.

20. A heating device comprising:
- a plurality of heat-generating elements, each heat-generating element including at least one positive temperature coefficient element and electric conductors which are in contact with opposed lateral surfaces of the at least one positive temperature coefficient element;
- electric conductors having inner surfaces that are in contact with opposed sides of the positive temperature coefficient heating element;

an insulating housing enclosing said positive temperature coefficient heating element and the electric conductors;

a plurality of heat-emitting elements arranged in parallel layers and supported such that they are in contact with opposed sides of the heat-generating element; wherein respective outer surfaces of each of the electric conductors of the heat-emitting elements are in contact with opposed sides of the heat-generating element via an interposed insulating layer comprising at least two interconnected plastic sheets, and wherein each insulating layer is connected to the insulating housing via insert moulding.

21. The heating device of claim 20, wherein each insulating layer is connected to the housing such that the end faces of the electric conductor are encompassed by the insulating layer.

* * * * *